No. 688,624. Patented Dec. 10, 1901.
M. FRANK.
INSULATING MATERIAL.
(Application filed Sept. 15, 1899.)
(Specimens.)
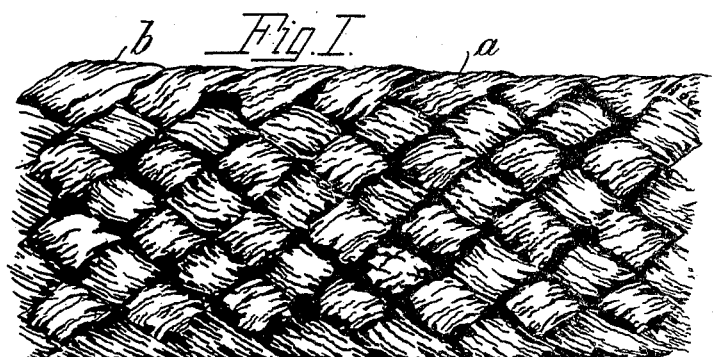
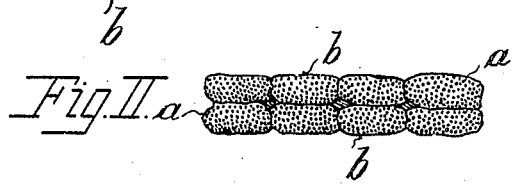
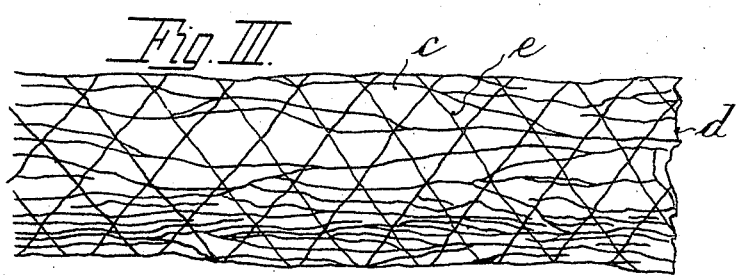
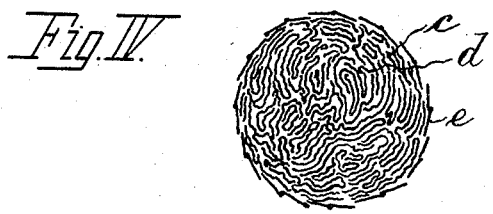
Attest
Inventor
Max Frank
by Richards & Co
Att'ys

UNITED STATES PATENT OFFICE.

MAX FRANK, OF STRASBURG, GERMANY, ASSIGNOR TO EMIL FRANK, OF NEW YORK, N. Y.

INSULATING MATERIAL.

SPECIFICATION forming part of Letters Patent No. 688,624, dated December 10, 1901.

Application filed September 15, 1899. Serial No. 730,610. (Specimens.)

*To all whom it may concern:*

Be it known that I, MAX FRANK, a subject of the German Emperor, and a resident of Els.-Rupprechtsau, Strasburg, Alsace, Germany, have invented certain new and useful Improvements in Insulating Material and Processes of Obtaining the Same; and I do hereby declare that the following is a full, clear, and exact description of the invention, which will enable others skilled in the art to which it appertains to make and use the same, reference being had to the accompanying drawings, which form a part of this specification.

My invention relates to an insulating material intended for preventing losses of heat, and has for its object to provide an article of this class and a process which will be highly efficient and the cost of which will be relatively low. I employ as a raw material impure or half-silk—that is, silk mixed with cotton or the like—which has been treated with acids for the purpose of destroying the vegetable admixtures, and the remaining animal product is further worked, as will be described presently, and also shaped into forms suitable for the intended use.

Reference is to be had to the accompanying drawings, in which—

Figure 1 is a plan. Fig. 2 is a section of the insulating material formed to a mat. Fig. 3 is an elevation of the new material formed into a rope, and Fig. 4 is a section of the same.

I will first describe the preparatory process which is used for removing the vegetable admixture from the raw material to bring it in condition for treatment according to my invention. This raw material may be old silk threads or rags of impure silk—that is, silk mixed with cotton or the like. This material I expose to vapors of hydrochloric acid for a certain period to carbonize the material until the vegetable admixtures are decomposed. The products of decomposition are removed by shaking and washing, together with the remainders of hydrochloric acid. The raw material having thus been brought into condition suitable for further treatment I treat it with breaking-cards, thereby felting the material, and the resulting mass of felt-like texture may be further worked into various forms. For instance, hanks may be formed from it, which may be made into a mat, as shown in Figs. 1 and 2.

$a$ designates the threads, and $b$ the hanks. The hanks may be twisted in order to form the mat.

Instead of bringing the felted material into hank shape it may be formed into a cord or rope, and around this cord or rope may be wound a netting made of tinned wire.

In Figs. 3 and 4, $c$ is the silk rope or cord formed of the felted rags $d$, and $e$ is the wire mantle.

The new material is wound or otherwise placed around the pipes, reservoirs, or other articles to be protected against loss of heat and is secured thereon in any appropriate manner.

The thickness of the insulating material will depend on circumstances; but in most cases a thickness of about one and one-quarter inches will be sufficient.

I desire it to be particularly understood that my improved insulating material is derived from carbonized half-silk dressed to a felt-like texture and that this dressing by means of cards or equivalent mechanism is an essential feature of my invention.

Having described my invention, what I claim, and desire to secure by Letters Patent, is—

1. A material insulating against heat, derived from carbonized half-silk dressed to a felt-like texture.

2. A material insulating against heat, consisting of a rope or cord of material derived from carbonized half-silk dressed to a felt-like texture, and a wire netting or mantle extending around said rope.

3. The herein-described process of making a heat-insulating material, which consists in dressing carbonized half-silk to a felt-like texture, and forming the resulting mass into a consistent fabric.

In witness whereof I have hereunto set my hand in presence of two witnesses.

MAX FRANK.

Witnesses:
MAX ADLER,
MAX J. BAEHR.